(12) United States Patent
Ward

(10) Patent No.: US 9,982,557 B2
(45) Date of Patent: May 29, 2018

(54) VTG MECHANISM ASSEMBLY USING WAVE SPRING

(75) Inventor: Daniel Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 1154 days.

(21) Appl. No.: 12/087,276

(22) PCT Filed: Jan. 9, 2007

(86) PCT No.: PCT/US2007/000499
§ 371 (c)(1),
(2), (4) Date: Jun. 30, 2008

(87) PCT Pub. No.: WO2007/111759
PCT Pub. Date: Oct. 4, 2007

(65) Prior Publication Data
US 2009/0053044 A1 Feb. 26, 2009

Related U.S. Application Data

(60) Provisional application No. 60/762,663, filed on Jan. 27, 2006.

(51) Int. Cl.
*F01D 17/16* (2006.01)
*F01D 25/12* (2006.01)
*F02C 6/12* (2006.01)

(52) U.S. Cl.
CPC ......... *F01D 17/165* (2013.01); *F01D 25/125* (2013.01); *F02C 6/12* (2013.01);
(Continued)

(58) Field of Classification Search
CPC .. F01D 17/165; F01D 25/125; F05D 2220/40; F05D 2240/55; F05D 2250/611; F05D 2260/30; F02C 6/12
(Continued)

(56) References Cited

U.S. PATENT DOCUMENTS 3,975,911 A     8/1976   Morgulis et al.
4,198,192 A *   4/1980   Webb ............................ 417/373
(Continued)

FOREIGN PATENT DOCUMENTS

DE    20 2005 009491     *   8/2005
WO     WO 03/023194       3/2003
(Continued)

*Primary Examiner* — Igor Kersheteyn
*Assistant Examiner* — Brian P Wolcott
(74) *Attorney, Agent, or Firm* — Eric L. Doyle; Stephan A. Pendorf; Patent Central LLC

(57) ABSTRACT

A turbocharger unit (10) incorporating variable turbine geometry. The unit (10) has a turbine housing (12) for receiving exhaust gases from an engine, a turbine wheel (14) located inside a turbine housing (12), and a bearing housing (24) connected to the turbine housing (12), having a recessed portion (28). A spring member is located in the recessed portion (28), and a heat shield (32) receives apply force from the spring member. There is also a cartridge for providing variable turbine geometry located in the turbine housing (12); the cartridge is held in contact with the turbine housing (12) by the spring member in the form of a contoured sleeve (26). The apply force received by the heat shield (32) from the spring member transfers through the cartridge, and holds the cartridge in place in the turbine housing.

4 Claims, 1 Drawing Sheet

(52) U.S. Cl.
CPC ...... *F05D 2220/40* (2013.01); *F05D 2240/55* (2013.01); *F05D 2250/611* (2013.01); *F05D 2260/30* (2013.01)

(58) Field of Classification Search
USPC ............... 415/120, 177, 196, 214.1, 224
See application file for complete search history.

(56) References Cited

U.S. PATENT DOCUMENTS

| | | | |
|---|---|---|---|
| 5,087,176 A * | 2/1992 | Wieland | 417/407 |
| 6,168,375 B1 * | 1/2001 | LaRue et al. | 415/146 |
| 6,916,153 B2 * | 7/2005 | Boening | 415/163 |
| 7,559,199 B2 * | 7/2009 | Sausse | F01D 17/165 |
| | | | 415/159 |
| 7,600,969 B2 * | 10/2009 | Frankenstein | F01D 17/16 |
| | | | 267/151 |
| 8,784,076 B2 | 7/2014 | Frankenstein et al. | |
| 2006/0010880 A1 * | 1/2006 | Kim | 60/805 |

FOREIGN PATENT DOCUMENTS

| | | |
|---|---|---|
| WO | WO 2004/022926 | 3/2004 |
| WO | WO 2004/048755 | 6/2004 |

\* cited by examiner

VTG MECHANISM ASSEMBLY USING WAVE SPRING

CROSS-REFERENCE TO RELATED APPLICATIONS

This application is a National Stage of International Application No. PCT/2007/000499, filed Jan. 9, 2007. This application claims the benefit of U.S. Provisional Application No. 60/762,663, filed Jan. 27, 2006. The disclosures of the above applications are incorporated herein by reference.

FIELD OF THE INVENTION

The present invention relates to variable turbine geometry turbochargers, the positioning of a set of vanes in relation to the turbine wheel, and how the vanes are held in place.

BACKGROUND OF THE INVENTION

Turbochargers are generally known and used for increasing power in both internal combustion and diesel engines. Exhaust gas is used to provide energy for a turbine, and the turbine drives a compressor which is typically mounted on a common shaft with the turbine. The compressor receives air from atmosphere, compresses it, and forces the air into the intake manifold of the engine. One feature commonly used in some turbochargers is the concept of variable turbine geometry (VTG). A turbocharger which employs the concept of VTG has the capability of varying the amount of exhaust gas flowing through the turbine, and can vary the amount of exhaust gas flow independent of engine speed.

Assembly of most VTG turbochargers involves the use of a "cartridge," which is placed in a turbine housing such that the cartridge surrounds the turbine wheel. The cartridge is a circular object typically made of two metal rings which hold together a series of vanes. The angle of the vanes relative to the turbine wheel can be changed, thereby changing the amount of exhaust gas flow through the turbine. Current generation passenger car VTG turbochargers use a Belleville-washer-shaped heat shield to provide a spring load against the cartridge to ensure that the cartridge stays in place during turbocharger operation. This heat shield essentially performs two functions, one is to hold the cartridge in place, and another is to deflect heat from the exhaust gas, preventing damage to various turbocharger components.

One common problem with the heat shield performing the function of holding the cartridge in place is that the heat shield comes in contact with the hot exhaust gas from the engine, and therefore could potentially relax and lose shape. This most often occurs when the turbine wheel is a standard wheel with scallops between the blades. If the Belleville-washer-shaped heat shield relaxes and loses shape, the amount of force applied to the cartridge could potentially be reduced, and the cartridge may no longer be held in the correct position relative to the turbine wheel.

Also, the heat shield occupies a large gap located between the turbine wheel and the bearing which supports the shaft upon which the turbine wheel is mounted. This large gap reduces efficiency if used with the standard wheel having scallops between the blades. The gap could allow oil leakage across the piston ring seal due to reduced pressures between the turbine wheel and heat shield. The gap also requires a relatively large distance between the turbine wheel and the bearing that supports the shaft which could lead to increased efficiency losses due to the required, increased radial clearance between the turbine wheel and turbine housing, and could lead to increased instability for the bearing.

Therefore, there exists a need for a way to hold the cartridge of the VTG turbine in place while resisting heat from the exhaust gases to avoid deformation.

SUMMARY OF THE INVENTION

The present invention overcomes the aforementioned problems by having a spring member for holding the cartridge of a variable turbine geometry turbocharger as a separate component from the heat shield, which is used to apply force to a heat shield; the force is transferred through the heat shield and holds the cartridge in place in the turbine housing.

Accordingly, the present invention is a turbocharger unit incorporating variable turbine geometry. The unit has a turbine for receiving exhaust gases from an engine having a turbine wheel located inside a turbine housing, and an bearing housing connected to the turbine housing, having a recessed portion. A spring member is located in the recessed portion, and a heat shield receives applied force from the spring member. There is also a cartridge for providing variable turbine geometry comprising vanes located between a first disk and a second disk in the turbine housing. The second disk is held in contact with the turbine housing by a contoured sleeve. The applied force received by the heat shield from the spring member transfers to the cartridge, locating the cartridge in proximate relationship to the turbine wheel.

The heat shield prevents the spring member from being exposed to heat from the exhaust gases, and the cartridge includes vanes which can alter the flow of exhaust gas through the turbine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
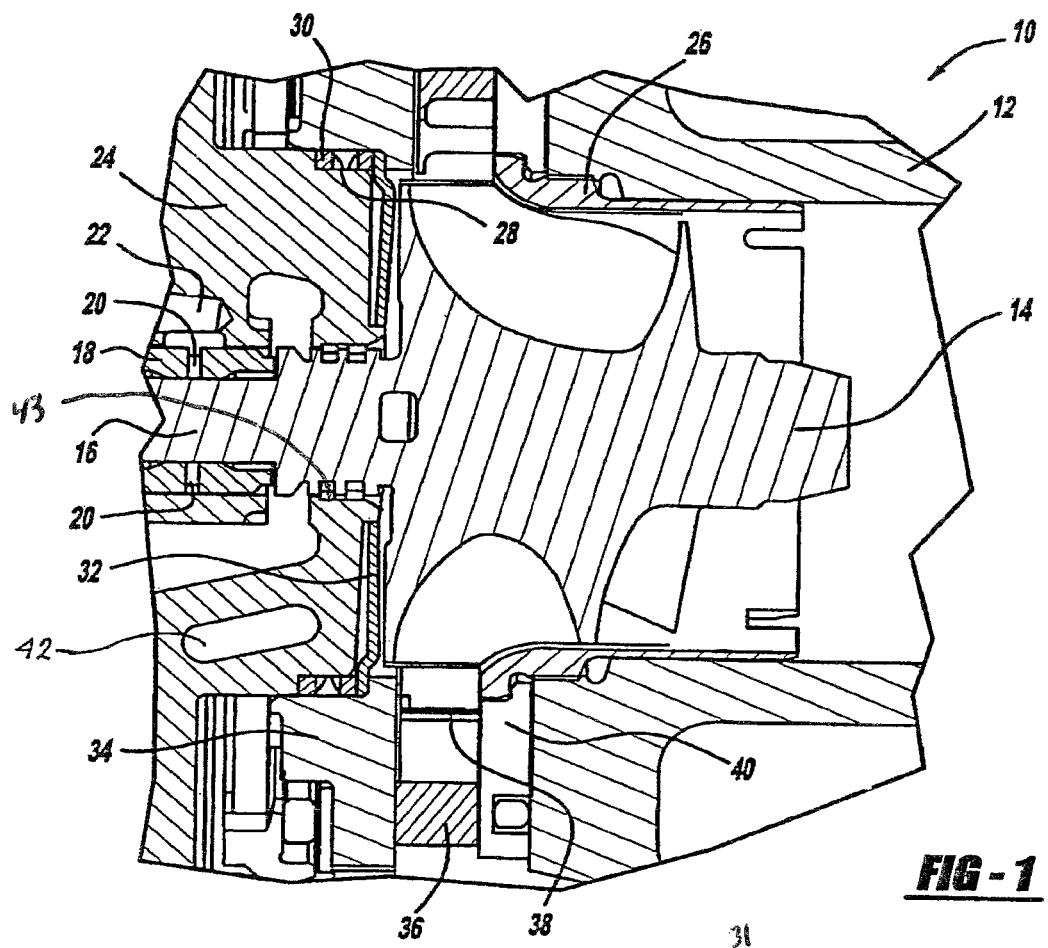
FIG. 1 is a side view of a turbocharger unit, according to the present invention.
Figure 2:
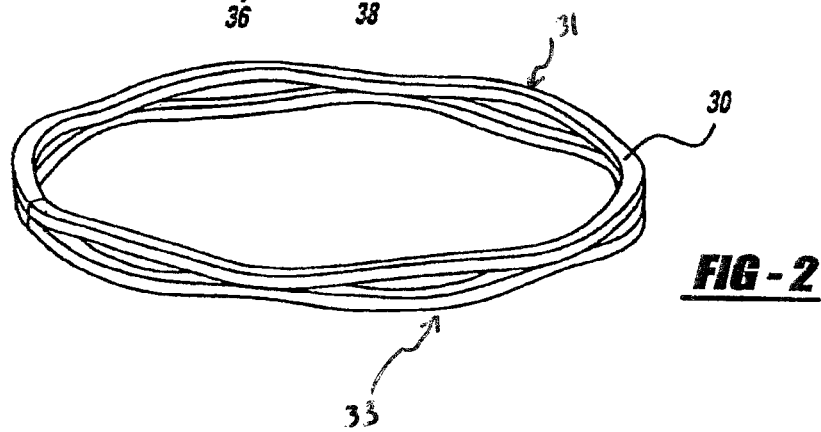
FIG. 2 is a plan view of a wave spring used in a turbocharger unit, according to the present invention.

The following description of the preferred embodiment(s) is merely exemplary in nature and is in no way intended to limit the invention, its application, or uses.

A turbocharger unit incorporating the present invention is generally shown at 10. There is a turbine housing 12, which surrounds a turbine wheel 14. The turbine wheel 14 is mounted on a shaft 16; the shaft 16 extends through, and is supported by, a set of bearings 18. The bearings 18 feature a set of oil passages 20, which are connected to a primary oil passage 22. The turbine housing 12 is connected to a bearing housing 24. The turbine housing 12 has a contoured sleeve 26 which circumferentially surrounds the turbine wheel 14.

The bearing housing 24 includes a recessed portion 28 for supporting a spring member, which in this embodiment is a wave spring 30. The wave spring 30 rests between the recessed portion 28, and a heat shield 32. The heat shield 32 also rests against a first disk 34. The first disk 34 rests against a spacer 36 which provides axial separation between the disks so that a series of vanes 38 provided between the disks can be adjusted to vary the amount of exhaust gas flowing into the turbocharger unit 10. The spacer 36 also contacts a second disk 40, which is held in position to rest against the turbine housing 12 by the apply force provided by contoured sleeve 26.

The bearing housing 24 also includes a water cooling jacket 42, which is used to circulate coolant, such as water, through the bearing housing 24.

In operation, exhaust gas flows into the turbine housing 12 and through the vanes 38 of the cartridge 36. The flow of exhaust gas causes the turbine wheel 14 to rotate, which in turn causes the shaft 16 to rotate as well. The shaft 16 is connected to a compressor (not shown) which compresses air and forces the air into the intake manifold of an engine, increasing power. The shaft 16 is lubricated by oil that flows from the primary oil passage 22 into the oil passages 20 and onto the shaft 16. The wave spring 30 has a bearing housing facing side 31 which applies a force to the bearing housing 24 and a heat shield facing side 33 which applies a force to the heat shield 32, which transmits the force to the first disk 34 of the cartridge 36. The load applied to the first disk 34 is also applied to the spacers 36, and via the spacers to the second disk 40 of the cartridge 36. Essentially, the function of the wave spring 30 is to hold the cartridge 36 in place after assembly into the turbine housing 12 by transferring an applied load through the heat shield 32 to the cartridge 36. It should be noted that the spring member is not limited to being a wave spring 30; the spring member could also be any type of spring capable of holding the cartridge 36 in place.

The exhaust gas flows through the turbine housing 12 at very high temperatures; the heat shield 32 functions to protect the wave spring 30 from being exposed directly to the exhaust gas, preventing distortion of the wave spring 30. The heat shield 32 also provides the advantage of allowing the bearings 18 to support the shaft 16 in a position closer to the turbine wheel 14, as well as allow the water cooling jacket 42 to be formed in the bearing housing 24 closer to the turbine wheel 14, allowing for more efficient cooling of the turbocharger unit 10.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A turbocharger unit comprising:
a turbine housing having a turbine wheel;
a compressor housing having a compressor wheel;
a bearing housing between the turbine housing and the compressor housing and having a bearing for a shaft carrying the turbine wheel and the compressor wheel, the shaft having a shaft axis, the shaft provided with a piston ring seal;
a VTG cartridge comprising a first disk (34), a second disk (40), and a series of variable angle vanes (38) between the first disk (34) and second disk (40) in the turbine housing providing variable turbine geometry, the VTG cartridge having a turbine housing facing side and a bearing housing facing side;
a substantially planar heat shield, with an outer periphery contacting the bearing housing facing side of the VTG cartridge, and
an axial force transmitting member, located in a circumferential recess in said bearing housing axially adjacent said substantially planar heat shield outer periphery, said axial force transmitting member pressing the substantially planar heat shield against the VTG cartridge, wherein the axial force transmitting member is a wave spring member between the heat shield and the bearing housing, the wave spring member having a first axial spring face contacting the bearing housing and a second axial spring face contacting said outer periphery of said heat shield, wherein the first and second spring faces have the same radius from the shaft axis as said outer periphery of said heat shield, and the first and second spring faces are spaced axially perpendicular to the outer periphery of the heat shield,
wherein the first disk (34), the second disk (40), and the series of variable angle vanes (38) between the first disk (34) and the second disk (40) of the VTG cartridge are held in place after assembly into the turbine housing by transfer of applied force from the wave spring member through the substantially planar heat shield to the VTG cartridge.

2. The turbocharger unit of claim 1, wherein said VTG cartridge includes the series of variable angle vanes, wherein the angle of each variable angle vane relative to the turbine wheel can be changed to alter a flow of exhaust gas through said turbine wheel.

3. The turbocharger unit of claim 1, wherein said applied force received by said substantially planar heat shield from said wave spring member positions said substantially planar heat shield in said housing between said bearing housing and said turbine housing.

4. The turbocharger unit of claim 1, wherein said wave spring member maintains the position of said heat shield relative to said turbine wheel.

* * * * *